US005525176A

United States Patent [19]

Higa

[11] Patent Number: 5,525,176

[45] Date of Patent: Jun. 11, 1996

[54] REINFORCED CRIMPED PAPER OBJECTS AND METHODS FOR MAKING REINFORCED CRIMPED PAPER OBJECTS

[76] Inventor: James Z. Higa, 272 Sylvan, Glencoe, Ill. 60022

[21] Appl. No.: 447,201

[22] Filed: May 22, 1995

[51] Int. Cl.$^6$ .................... B32B 31/00

[52] U.S. Cl. .................... 156/183; 493/407

[58] Field of Search .................... 156/183; 162/111, 162/112, 113; 493/407; 8/114.5

[56] References Cited

U.S. PATENT DOCUMENTS

| | | | |
|---|---|---|---|
| 2,020,928 | 11/1935 | Asnes | 156/183 X |
| 3,685,400 | 8/1972 | Higa | 493/307 |
| 3,859,897 | 1/1975 | Higa | 493/276 |

*Primary Examiner*—James Engel
*Attorney, Agent, or Firm*—Greer, Burns & Crain, Ltd.

[57] ABSTRACT

Crimped paper articles are reinforced by rolling a piece of paper around a sleeve and pressing one end of the paper and sleeve against a hard surface. The sleeve is repeatedly lifted in small increments and the paper is pushed down towards the hard surface, creating crimps in the paper. When the paper is substantially crimped, it is removed from the sleeve and straightened. Vinyl duct tape or another resilient material is applied to the underside of the paper for reinforcement, and the paper is formed into a useful or art article. The vinyl tape makes the article stronger and more configurable. The vinyl tape also keeps the article from losing its shape. Transparent tape can be applied to the outer surface of the articles to further protect the articles from dehydration, humidity and decay.

10 Claims, 4 Drawing Sheets

REINFORCED CRIMPED PAPER OBJECTS AND METHODS FOR MAKING REINFORCED CRIMPED PAPER OBJECTS

This invention relates to objects made with crimped paper or other crimped pliable sheet material and methods for making and reinforcing the objects with other materials. More particularly, this invention relates to objects made with paper which is rolled around a rigid tubing to create a paper cylinder crimped with uniform pleats. The cylinder is unrolled without destroying the pleats and reinforced for form retention while maintaining flexibility. A wide variety of two and three dimensional objects can be made with one or more reinforced crimped paper.

BACKGROUND OF THE INVENTION

Pools and methods for crimping paper into tubes are known, as seen in U.S. Pat. Nos. 3,859,897 and 3,685,400, both of which are incorporated herein by reference in their entirety. Crimped paper tubes made in accordance with these patents can be cut, formed and assembled into a variety of interesting useful articles and art objects, including flowers, mushrooms, and animals. Kits made in accordance with the inventions disclosed in those patents, sold under the trademark "KRIMPART®," have also been used to make furniture, wall hangings and other things.

The crimped paper tubes can also be unrolled after they are crimped. A problem with using unrolled tubes of crimped paper to make useful or art objects is that the unrolled paper, while still crimped or pleated, is then flat. The paper is weak and creases in an undesired manner if it is inadvertently mis-handled and folded. Thus, there is a need to reinforce flat, crimped paper.

Articles made from paper can be damaged easily because paper is vulnerable to moisture. In addition, paper stains easily from liquid spills. These problems are significant if the paper is in the form of a useful or art object. Thus, there is also a need to protect paper objects from moisture and liquid spills by waterproofing exposed surfaces of the paper.

Accordingly, an object of the present invention is to provide new and improved methods and apparatus for making folded or crimped paper articles, including two and three-dimensional useful and art objects.

Another object of the present invention to provide ornamental crimped paper articles which are sturdy in construction and well-protected from decay or destruction.

SUMMARY OF THE INVENTION

In keeping with one aspect of this invention, a useful or art object is made from a piece of paper or other pliable sheet material. The paper can be reinforced by placing aluminum foil between two sheets of paper, with or without adhesive. Alternatively, several sheets of paper can be glued together. The paper is rolled around a cylinder of stiff material, creating a cylinder of paper. One end of the paper cylinder is pressed against a hard surface such as a table. The paper cylinder is lifted slightly without moving the paper tube. The cylinder can be turned slightly as it is lifted, if desired. The paper is pushed down against the surface, crimping a small part of the paper. The cylinder is lifted slightly again, and another crimp is made in the paper by again pushing the paper downwardly. This process is repeated until substantially the entire cylinder of paper is crimped or pleated.

The crimped cylinder can be unrolled without disturbing the crimps. The crimped paper is then flat.

The unrolled paper can be reinforced with self-adhesive tape or the like on one side. A protective cover of transparent tape can be placed on the reverse side to waterproof the exposed surface of the paper, if desired. The protective cover can be applied before or after crimping. The unrolled paper tube can be cut and formed into a variety of interesting useful and art objects such as neckties, hats, caps, belts, vests, and the like.

BRIEF DESCRIPTION OF THE DRAWINGS

Other features and advantages of the present invention will be apparent from the following description taken in conjunction with the accompanying drawings, in which.

DETAILED DESCRIPTION OF THE INVENTION

Figure 1:
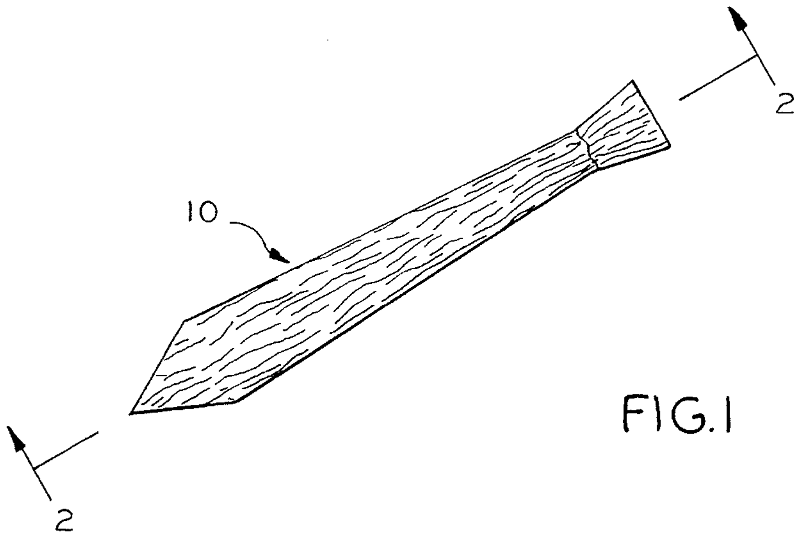
FIG. 1 is a top view of a necktie made in accordance with the principles of the present invention.
Figure 2:
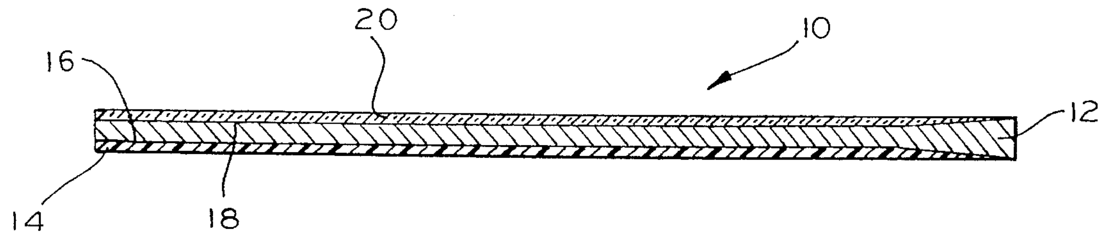
FIG. 2 is a side cross-sectional view of the necktie of FIG. 1, taken along lines 2—2 in FIG. 1.

As seen in FIGS. 1 and 2, a three-dimensional object such as a necktie 10 includes material 12 and a suitable backing 14 secured to a selected side of the material 12. The material 12 is any suitable pliable sheet material, with the ability to maintain a crease. Paper is preferred, although other materials including cloth can be used, as well. While unprinted paper can be used, aesthetically interesting designs can be obtained by using printed paper, such as newspaper.

The backing 14 is secured to the paper 12 after the paper has been crimped into a desired shape. In the tie 10, the backing 14 is secured to a back side 16 of the material 12, leaving a side 18 exposed.

The backing 14 can be any commercially available duct tape or the like which is pliable, but does not retain a crease. It should also be water resistant, to protect the paper from moisture damage.

To further protect the necktie 10 from moisture damage, the exposed surface 18 can be covered with a transparent, water-resistant material such as tape 20. The tape 20 can be any suitable cellophane or other self-adhesive tape.

Figure 3:
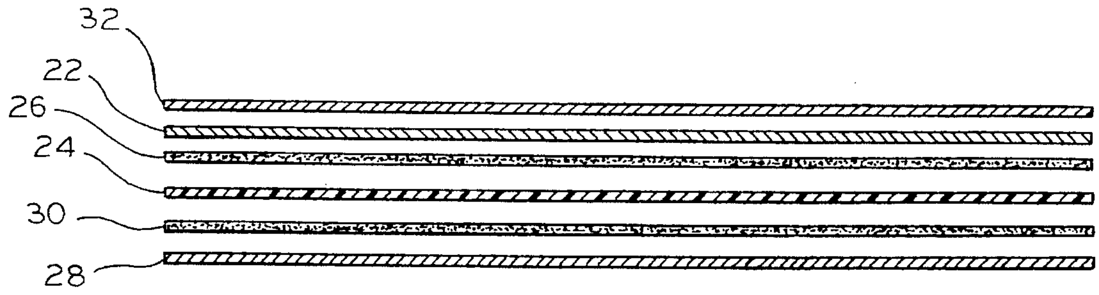
FIG. 3 is an exploded side cross-sectional view of an alternate embodiment of the necktie of FIG. 1, also taken along lines 2—2 in FIG. 1.

FIG. 3 shows an alternate construction used to make articles in accordance with the principles of this invention. In this embodiment, a piece of paper 22 is secured to a piece of aluminum foil 24 by a layer of adhesive 26. The adhesive can be YES bookbinding glue, or any other suitable, preferably pliable adhesive. Another piece of paper 28 is secured to the other side of the foil 24 by a layer of adhesive 30. It is also contemplated that this embodiment could made without adhesive, if desired. Transparent contact paper 32 can be applied over the paper 26 after the paper is crimped, if desired. Because the foil adds rigidity, this embodiment is useful for making many objects, such as sculptural objects. Neckties would probably not be made with this construction, however, because they move in use.

Figure 4:
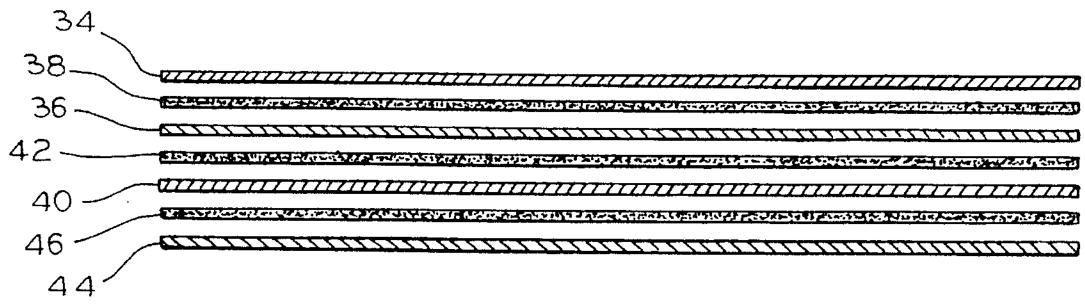
FIG. 4 is an exploded side cross-sectional view of still another alternate embodiment of the necktie of FIG. 1, also taken along lines 2—2 in FIG. 1.

Another alternate construction of the necktie 10 is shown in FIG. 4. In that embodiment, a piece of paper 34 is secured to a second piece of paper 36 by a layer of adhesive 38. A third piece of paper 40 is secured to the second paper 36 by a second layer of adhesive 42, and a fourth piece of paper 44 is secured to the third paper 40 by a third layer of adhesive 46.

Figure 5:
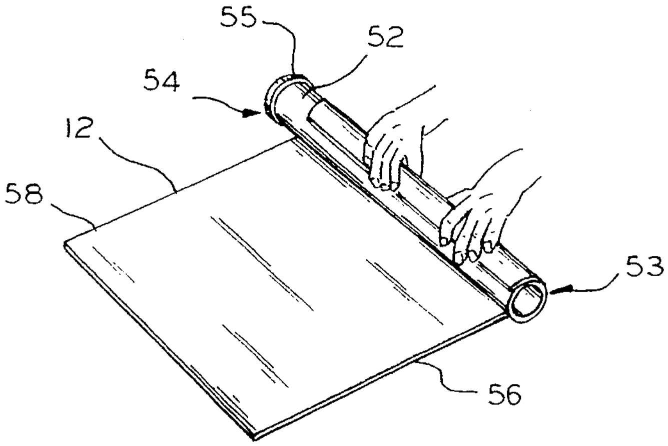
FIG. 5 is a perspective view of a step in the process of making three dimensional objects in accordance with the present invention, in which a piece of paper is rolled onto a tube.
Figure 6:
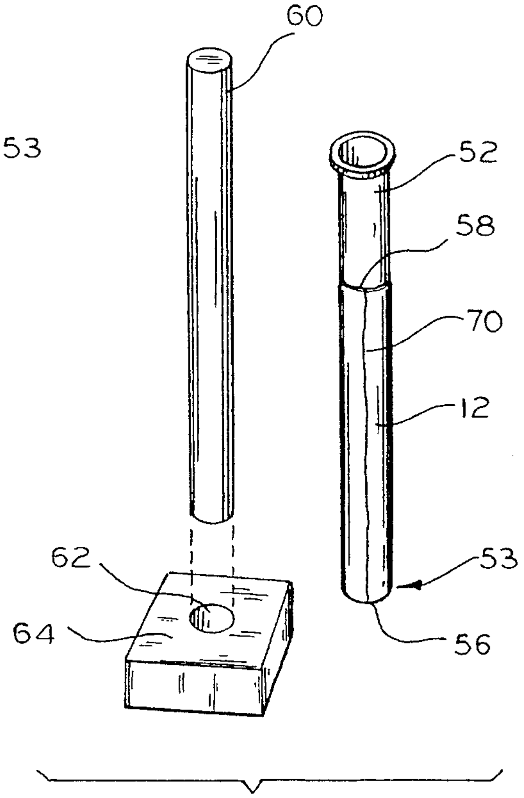
FIG. 6 is a perspective view of apparatus which can be used to make three dimensional objects in accordance with the present invention.

The embodiment of the necktie 10 shown in FIG. 2 is made by wrapping the paper 12 around a sleeve 52, as shown in FIG. 5. The sleeve 52 includes a crimping end 53 and a holding end 54. A flange 55 may be provided at the holding end 54 of the sleeve 52 to aid in gripping the sleeve 52. The sleeve 52 can be made from plastic, metal, cardboard or the like, so long as it provides sufficient stiffness and rigidity to perform the crimping process. The outer surface of the sleeve 52 is preferably smooth and even so that the paper 12 can slide easily down off the sleeve 52.

The paper 12 has a first edge 56 and a second edge 58. The paper 12 is wrapped around the sleeve 52 as shown in FIG. 5, and then the paper 12 is slid down the sleeve 52 until the first edge 56 is flush with the crimping end 24 of the sleeve 52.

The paper 12 can be crimped several ways. For example, the sleeve 52 can be placed over a cylinder 60, which fits into an opening 62 in a base 64. The base 64 provides a solid, hard surface for crimping the paper. However, the cylinder 60 and the base 64 are not needed, and the paper 12 can be crimped by simply placing the end 50 of the sleeve 52 on a table or other firm surface.

Figure 7:
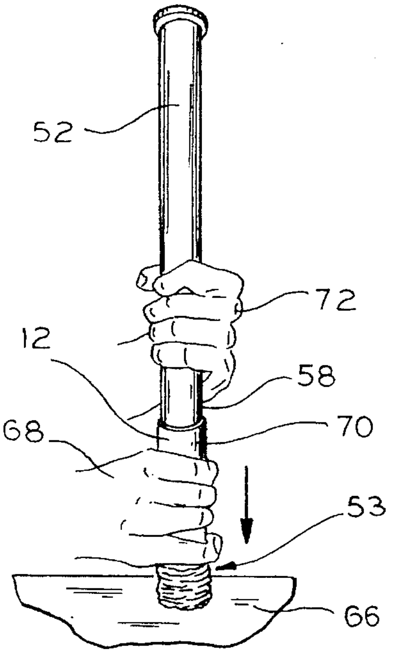
FIG. 7 is a perspective view of another step in the process of making three dimensional objects in accordance with the present invention.

As seen in FIG. 7, the paper 12 is held in place on the sleeve 52 while the crimping end 50 of the sleeve 52 is placed upon a flat, secure surface such as a table 66. A first hand 68 holds an overlapped edge 70 of the paper 12, while a second hand 72 grips the sleeve 52.

The crimps can be made by lifting the sleeve 52 about ⅛ to ¼ inch inside the paper 12. The sleeve 52 can be turned about ⅛ turn while it is lifted, if desired, for better control. The paper 12 may be held in contact with the surface 66 when the sleeve 52 is lifted in this manner. The first hand 68 preferably holds the paper 12 flush against the secure surface 66 while the second hand 70 turns and lifts the sleeve 52.

On the downstroke, the first hand 68 holds the paper 12 against the sleeve 52, and downward pressure is applied to the paper 12, forcing it to fold or crimp. The sleeve 52 then rests near the top of the crimp. The sleeve 52 is then lifted again and another crimp is formed by the downward pressure of the hand 68. These turning, lifting and crimping steps are repeated until substantially the entire paper 12 is crimped.

The crimping step can be performed before the adhesive sets. The crimps can be manipulated before the adhesive hardens. The crimps can be made more tight or less tight, for example, or shape into different configurations.

The first hand 68 keeps the overlapping edge 70 from opening or tearing while the crimps are formed. After the crimping operation is finished, the edge 70 is held to the roll by the crimps.

Figure 8:
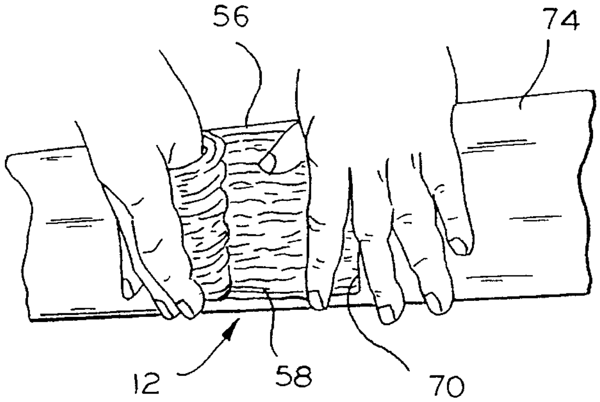
FIG. 8 is another perspective view of a step in the process of making three dimensional objects in accordance with the present invention.
Figure 9:
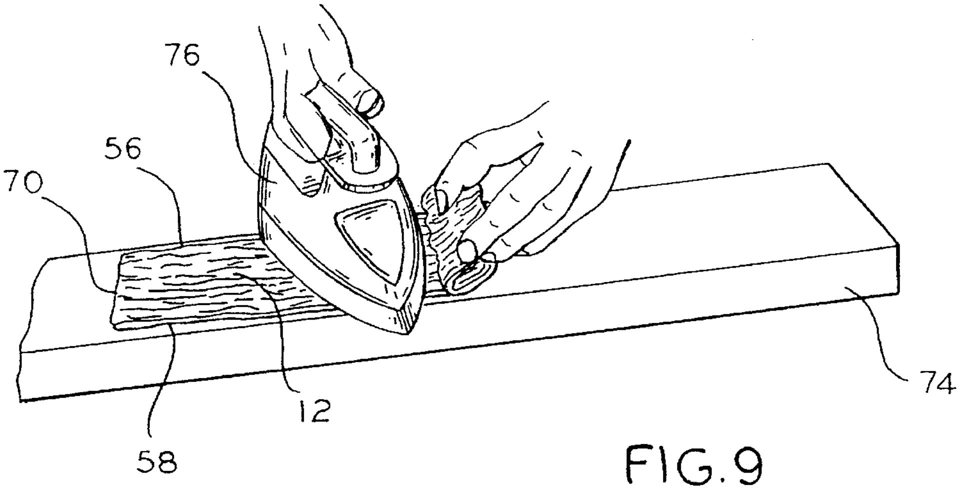
FIG. 9 is a perspective view of another step in the process of making three dimensional objects in accordance with the present invention.
Figure 10:
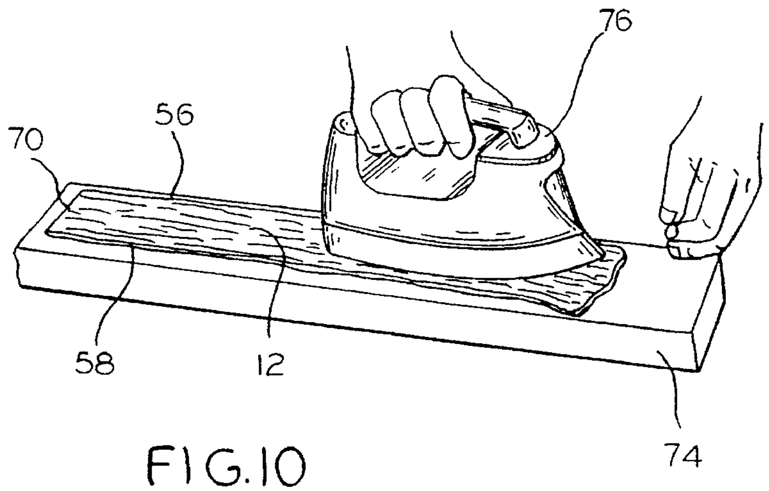
FIG. 10 is another perspective view of a step in the process of making three dimensional objects in accordance with the present invention.

The resulting crimped roll of material 12 is removed from the sleeve 52 and held in its crimped condition by hand, as seen in FIG. 8. The paper 12 should be held at the edges 56, 58 so the edges do not separate like a coiled spring.

The edge 70 of the crimped paper 12 is placed on a smooth, flat guide surface 74, such as a 2×4 piece of wood covered with cardboard, and the paper 12 is unrolled. While unrolling the paper 12, a steam iron 76 applies steam heat to the crimped paper 12, thus unrolling the paper 12 without disturbing the crimps, and fixing the crimps in the paper 12 to a desired density. The iron 76 is not used with adhesive. The edges 56 and 58 of the crimped paper 12 can be shaped, in a tapering manner, by compressing the crimped paper 12 between the thumb and fingers, using the guiding surface 74 to measure the amount of taper.

Figure 11:
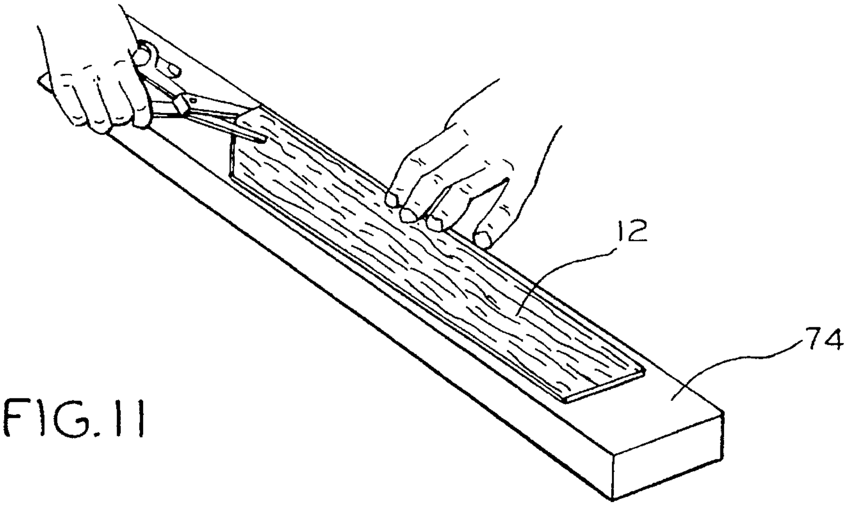
FIG. 11 is a perspective view of another step in the process of making three dimensional objects in accordance with the present invention.

When the paper 12 is unrolled, it can be cut to the shape of a necktie or other object, as seen in FIG. 11.

Figure 12:
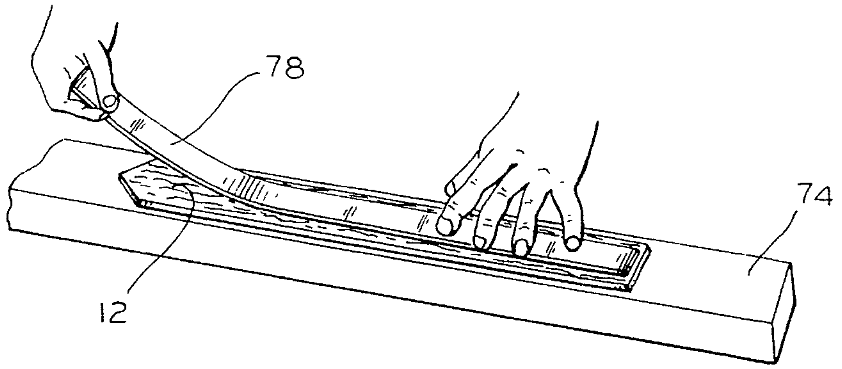
FIG. 12 is another perspective view of a step in the process of making three dimensional objects in accordance with the present invention.
Figure 13:
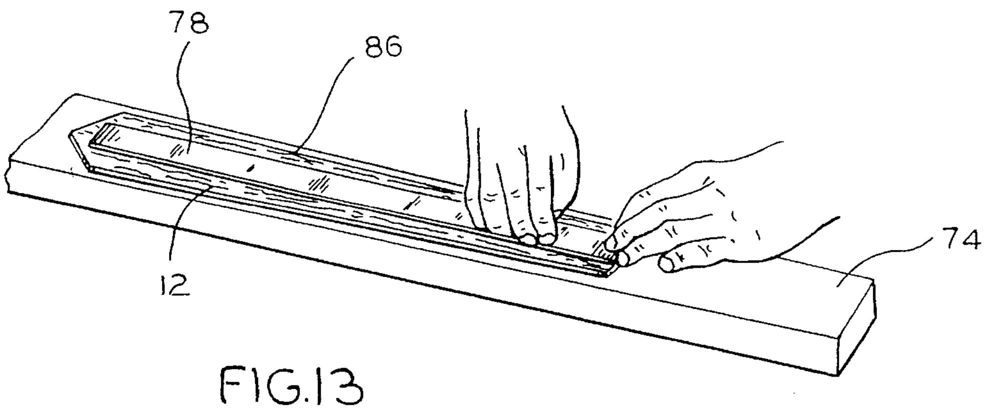
FIG. 13 is another perspective view of still another step in the process of making three dimensional objects in accordance with the present invention.

When the crimped paper 12 is completely unrolled, cloth tape 78, such as duct tape, is applied to the crimped paper 12, as shown in FIGS. 12 and 13. In most cases, the entire surface of the paper 12 is covered with the tape 78.

After the tape 78 is applied, it can be better secured in the creases of the paper 12 by rubbing the paper with a fingernail or other narrow, elongated device which does not cut the paper 12, as shown in FIG. 13. An ordinary hair comb can be used, as well.

Figure 14:
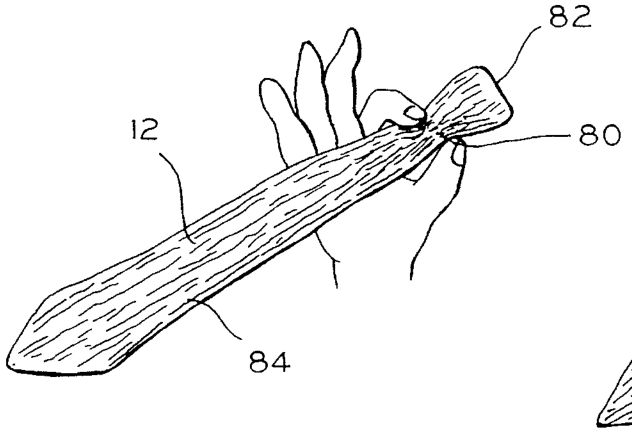
FIG. 14 is a perspective view of a further step in the process of making three dimensional objects in accordance with the present invention.
Figure 15:
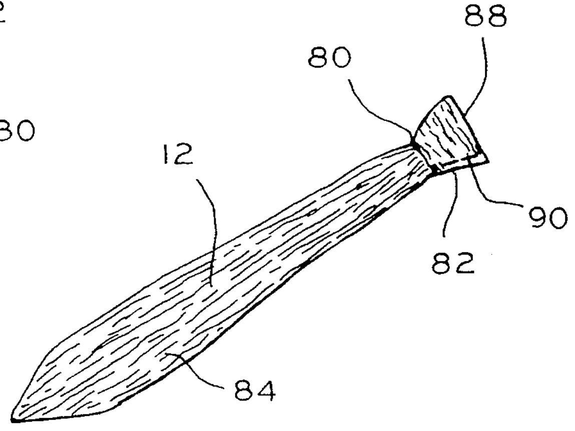
FIG. 15 is a perspective view of yet another step in the process of making three dimensional objects in accordance with the present invention.

The necktie 10 can be made by pinching a point 80 about five inches from an end 82 of the crimped paper 12. The end 82 is then wrapped just above the point 80 so that a crimped side 84 of the crimped paper 12 is exposed, and a taped side 86 (FIG. 13) is underneath the crimped side 84 (FIG. 14). First the knot end 82 is bent above the point 80. Then the knot end 82 is brought across the crimped side 84 so that the end 82 forms a knot 88. After the knot 88 is formed, the knot end 82 is cut, if needed, and secured with a staple 90, or the like.

From the foregoing description it will be appreciated that the disclosed crimping method and method for making and protecting articles enable one to make a wide variety of articles, only one of which has been described above. Accordingly, the scope of the invention is only to be limited as necessitated by the accompanying claims.

What is claimed is:

1. A method for making a useful or art object from a flat sheet of pliable material comprising the steps of:

rolling the material around a cylindrical sleeve having two ends, said rolled material having a cylindrical shape with two circular ends;

aligning a selected end of said rolled material with a selected end of said sleeve, pressing said selected end of said material and said sleeve against a first hard surface, repeatedly lifting said selected end of said sleeve without lifting said selected end of said material, and pressing said material towards said first hard surface to place at least one crimp in said material, until at least a portion of the material is crimped to form a crimped tube, removing said crimped tube from said sleeve, unrolling and straightening said crimped tube, reinforcing the unrolled crimped material, and forming the material into a useful or art article.

2. The method of claim 1 comprising the step of placing said piece of pliable material on a piece of metal foil before said pliable material is rolled around said cylindrical sleeve.

3. The method of claim 1 comprising the step of securing said piece of pliable material to at least one additional piece of pliable material with adhesive before said pliable material is rolled around said cylindrical sleeve.

4. The method of claim 1 wherein said material is paper.

5. The method of claim 1 wherein said material is newsprint.

6. The method of claim 1 wherein said material is reinforced with adhesive tape.

7. The method of claim 6 wherein said unrolled crimped paper has a plurality of crimps, comprising the step of pressing portions of said tape into said crimps.

8. The method of claim 1 wherein said unrolled crimped paper has two planar sides, and said self-adhesive tape is on a first of said planar sides, comprising the step of protecting the second of said planar sides from moisture and liquid spills with transparent self-adhesive tape.

9. The method of claim 1 comprising the step of cutting said unrolled paper tube so that the article is two-dimensional.

10. The method of claim 1 comprising the step of making the article three-dimensional.

* * * * *